Patented Sept. 12, 1933

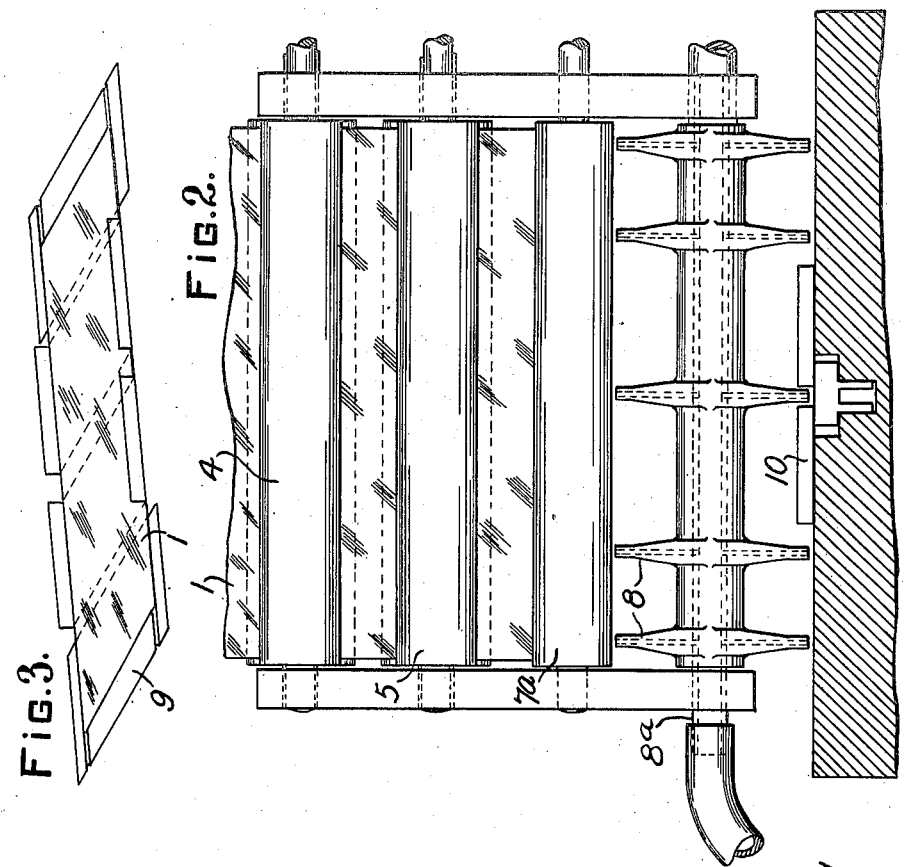
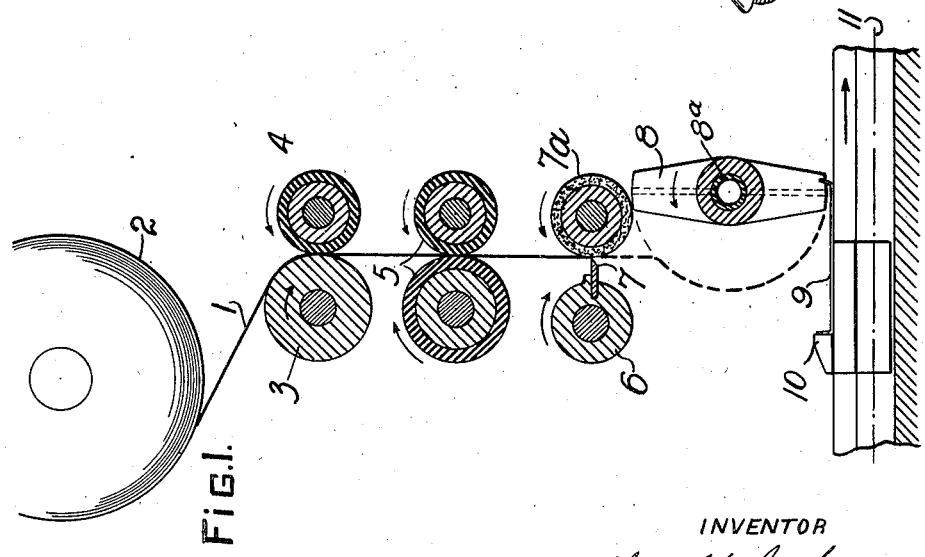

1,926,485

UNITED STATES PATENT OFFICE 1,926,485

PACKING MACHINERY

Donald Jackson, Deptford, London, England

Application June 2, 1931, Serial No. 541,651, and in Great Britain June 2, 1930

6 Claims. (Cl. 93—36)

This invention relates to packing machinery, and has for its object to provide an apparatus for feeding a strip of wrapping material, for example, tin foil on to the surface of a packet blank so that when the latter is folded up the wrapping material will be enclosed in the resulting packet. The invention comprises means for feeding a strip of material, for example, a strip of tin foil on to the surface of a packet blank comprising means for severing a web fed from a reel into strips, and means arranged to receive each severed strip and apply the same to a packet blank.

The invention will be more particularly described with reference to the accompanying drawing, in which:—

Fig. 1 is a sectional elevation of a foil feeding apparatus constructed according to the invention.

Fig. 2 is a front elevation of Fig. 1.

Fig. 3 is a perspective view of a packet blank showing a strip of foil applied thereto.

Referring to the drawing,—the web of foil or other wrapping material 1 is fed from a reel 2 by a pair of rollers arranged to emboss a design on the foil. One of the rollers 3 is made of hard metal, and has a design engraved thereon, and the co-operating roller 4 is of soft rubber or similar material. From these rollers the foil passes to a second pair of pulling rollers 5 of rubber or other suitable material mounted vertically beneath the embossing rollers and which pull the foil downwardly and prevent it from adhering to the embossing rollers.

In some cases, the position of the embossing and pulling rollers may be reversed. This is advantageous where pre-embossed or grained foil is used, in which case the embossing rollers may both be of metal and impress the design on the foil by rolling out the existing embossing or graining at various parts of the foil web.

The web of foil next passes through a cutting mechanism mounted beneath the second pair of rollers and comprising, for example, a rotating roller 6 having a blade 7 mounted on the periphery thereof arranged to contact with a roller 7ª of felt or similar soft material.

The knife is provided with a saw-tooth edge, the points of which, on coming into contact with the foil pierce the same, forming a line of perforations across the foil. The knife continues to rotate and owing to the shape of the teeth, each tooth cuts the foil in its immediate neighbourhood with a shearing action so that the effect is equal to a single continuous shearing cut.

The piece of foil, at the time of cutting, is arranged to hang downwardly from the cutting rollers, and at the instant of cutting a moving gripper, for instance, a rotating suction member 8, is arranged to seize the leading end of the foil and carry it in an arcuate path as indicated by the dotted line in Fig. 1 until the leading edge is laid upon the packet blank 9, whereupon the suction ceases and the trailing end of the foil falls down on to the blank which is carried away by a pusher piece 10 of a conveyor 11 or the like. The suction member 8 rotates on a fixed pipe 8ª through which the air passes to a pump.

The suction is preferably controlled by a rotary valve, which may be incorporated in the rotary suction member.

In order to ensure that the leading edge of the foil becomes attached to the suction nozzle, an oscillating arm may be provided which thrusts the leading edge of the foil into the path of the said sucker.

If desired, other forms of cutting apparatus may be used, for example, a rotary knife co-operating with a fixed knife, and a cam operated gripper may be used instead of the suction member, the construction illustrated being given merely by way of example.

What I claim as my invention and desire to secure by Letters Patent is:—

1. In apparatus for feeding a liner of sheet material on a packet blank, the combination with movable means for periodically and completely severing a continuous web of sheet material to form separate liners therefrom, of a member separate from but moving in timed relation to said means for receiving each liner before the latter is severed from the web, and delivering the severed liner to the blank.

2. In apparatus for feeding a liner of sheet material on a packet blank, the combination with movable means for periodically and completely severing a continuous web of sheet material to form separate liners therefrom, of separate means moving in a circular path in timed relation to said first named means for receiving each liner before the latter is severed from the web, and delivering the severed liner to the blank, said last named means including a suction element, and means for relieving the suction exerted by the element as delivery of the liner to the blank is completed.

3. In apparatus for feeding a liner of sheet material on a packet blank, the combination with movable means for periodically and completely severing a continuous web of sheet material to form separate liners therefrom, of means moving in timed relation to said first named means for receiving each liner before the latter is severed from the web, and delivering the severed liner to the blank, and web feeding means including a device for embossing said web for delivering the web to said severing means.

4. In apparatus for feeding a liner of sheet material on a packet blank, the combination with movable means for periodically and completely severing a continuous web of sheet material to form separate liners therefrom, of a separate rotatable member adapted to grip the leading edge of each liner before the latter is severed from the web and carry the same through a predetermined path into a position directly above and in proximity to the blank.

5. In apparatus for feeding a liner of sheet material on a packet blank, the combination with movable means for periodically and completely severing a continuous web of sheet material to form separate liners therefrom, of a separate member rotating in timed relation to the movement of said means and disposed adjacent thereto, said member being provided with suction ducts terminating in the peripheral portion thereof, whereby the leading edge of each liner may be gripped and carried through an arcuate path, and means for relieving the suction exerted through said ducts as the liner is delivered to the blank.

6. In apparatus for feeding a liner of sheet material on a packet blank, the combination with rotatable means for periodically and completely severing a continuous web of sheet material to form separate liners therefrom, of a suction device separate from but moving in timed relation to said means for receiving each liner before the latter is severed from the web, and delivering the severed liner to the blank.

DONALD JACKSON.